United States Patent [19]

Patel et al.

[11] 4,166,169

[45] * Aug. 28, 1979

[54] HIGH-STRENGTH ANAEROBIC SEALANTS CONTAINING N-NITROSOAMINE MODIFIER

[75] Inventors: Purshottam S. Patel, Elk Grove Village; Donald J. McDowell, Riverside, both of Ill.

[73] Assignee: Felt Products Mfg. Co., Skokie, Ill.

[*] Notice: The portion of the term of this patent subsequent to May 23, 1995, has been disclaimed.

[21] Appl. No.: 908,253

[22] Filed: May 22, 1978

Related U.S. Application Data

[63] Continuation-in-part of Ser. No. 664,391, Mar. 5, 1976, Pat. No. 4,090,997.

[51] Int. Cl.$^2$ .......................... C09J 3/14; C08K 5/08; C08K 5/22
[52] U.S. Cl. .................................... 526/313; 156/332; 526/292; 526/219
[58] Field of Search .................. 260/47 UA; 528/204, 528/205, 208, 206; 526/323.1, 313; 156/332

[56] References Cited

U.S. PATENT DOCUMENTS

| | | | |
|---|---|---|---|
| 2,558,139 | 6/1951 | Knock | 526/205 |
| 3,988,299 | 10/1976 | Malofsky | 526/204 |

*Primary Examiner*—Joseph L. Schofer
*Assistant Examiner*—Peter F. Kulkosky
*Attorney, Agent, or Firm*—Dressler, Goldsmith, Clement, Gordon & Shore, Ltd.

[57] ABSTRACT

An anaerobic sealant composition capable of polymerizing upon exclusion of air comprises (1) a polymerizable mixture of polyacrylic ester monomer which includes a polyacrylic ester derived from alkoxylated bisphenol-type compounds, (2) an inorganic salt initiator which can be a persulfate or a perchlorate of ammonium, alkali metal or an alkaline earth metal, (3) a polymerization accelerator which can be a secondary or a tertiary amine, a N,N-di(lower alkyl)amide of a monocarboxylic aliphatic acid, an organic carboximide of a polycarboxylic acid, or an organic sulfimide of a carboxylic acid, or mixtures of the foregoing, (4) a N-nitrosoamine, and (5) a quinone-type polymerization inhibitor. The composition is prepared by compounding the aforementioned ingredients and suitably aging the resulting formulation.

12 Claims, No Drawings

HIGH-STRENGTH ANAEROBIC SEALANTS CONTAINING N-NITROSOAMINE MODIFIER

CROSS-REFERENCE TO RELATED APPLICATION

This application is a continuation-in-part of copending application U.S. Ser. No. 664,391, filed on Mar. 5, 1976, now U.S. Pat. No. 4,090,997.

BACKGROUND OF THE INVENTION

This invention relates to a liquid monomeric composition which has anaerobic curing characteristics, that is, a composition which undergoes spontaneous polymerization to a solid state in the absence of air or substantial amounts of oxygen.

Sealant compositions of this general type have been formulated for bonding closely facing metal surfaces such as threaded joints, for joining nuts to bolts without lock washers, gears to shafts for rotation therewith, and the like. Such compositions are precatalyzed or pre-reacted monomeric compositions which polymerize in the absence of oxygen but the curing of which is inhibited by oxygen. While such compositions are stored in partially empty containers or air-permeable plastic containers, sufficient amounts of oxygen continuously contact the anaerobic composition to maintain the composition in an uncured, liquid state. However, when an anaerobic composition of this general type is placed between surfaces to be bonded or sealed and atmospheric oxygen, i.e., air, is effectively excluded, polymerization or cure of the composition commences within a relatively short time period and the composition will set to a solid state. The polymerization in the absence of air is accelerated by contact with active metals.

Anaerobic compositions generally are composed of polymerizable acrylic ester monomers and peroxide, hydroperoxide, and other similar polymerization initiators therefor together with amine, amide or imide latent polymerization accelerators which do not initiate polymerization but only accelerate the polymerization reaction once it has begun. In order to prevent premature polymerization of the monomer, it has been common practice to incorporate within the anaerobic compositions a small amount of a quinone-type stabilizer which inhibits free radical polymerization. Illustrative prior art anaerobic compositions are disclosed in U.S. Pat. Nos. 2,895,950; 3,041,322; 3,043,820; 3,046,262; 3,203,941; 3,218,305; 3,300,547; 3,720,656; 3,957,561; 3,980,627 and others.

Some of the anaerobic compositions heretofore known cannot be used on passivated metal surfaces such as stainless steel, cadmium-coated steel, zinc-coated steel, and the like, without the prior application of a primer while other such compositions, which are suitable for use with such surfaces, tend to promote corrosion when used on ordinary steel surfaces. The composition of the present invention, on the other hand, can be used with stainless steel and other passive metal surfaces as well as with ordinary steel to provide a relatively high-strength bond and without promoting corrosion. Additionally, the present composition exhibits relatively low toxicity as compared to other commercially-available anaerobic sealant compositions.

SUMMARY OF THE INVENTION

The present invention contemplates a high-strength anaerobic composition which utilizes certain inorganic salts as polymerization initiators for a mixture of polymerizable polyacrylic ester monomers which includes at least about 15 percent by weight of a polyacrylic ester derived from an alkoxylated bisphenol-type compound, in combination with a N-nitrosoamine modifier and with a polymerization accelerator which can be a secondary or tertiary amine, a N,N-di(lower alkyl) amide of a monocarboxylic aliphatic acid, an organic carboximide of a polycarboxylic acid, an organic sulfimide of a carboxylic acid, or admixtures of the foregoing. Additionally, a quinone-type polymerization inhibitor is present in the composition in an amount sufficient to retard polymerization of the aforesaid monomer mixture during storage of the composition in the presence of air.

DESCRIPTION OF THE PREFERRED EMBODIMENTS

The polymerizable monomer mixture suitable for use in compounding the present anaerobic sealant compositions includes a polyacrylic ester represented by the general formula

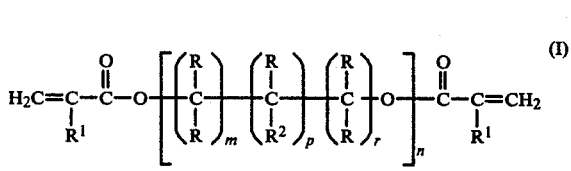

wherein R is a member of the group consisting of hydrogen, alkyl containing 1 to 4 carbon atoms, inclusive, hydroxyalkyl containing 1 to 4 carbon atoms, inclusive, and

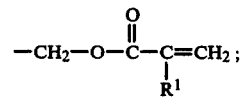

$R^1$ is a member of the group consisting of hydrogen, halogen, and alkyl containing 1 to 4 carbon atoms, inclusive; $R^2$ is a member of the group consisting of hydrogen, alkyl containing 1 to 4 carbon atoms, inclusive, hydroxy, and

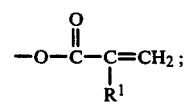

m is an integer having a value of at least 1; n is an integer having a value of at least 1; p is an integer having a value of 0 or 1; and r is an integer having a value of at least 1. Additionally, the polymerizable monomer mixture includes, in an amount constituting at least about 15 percent by weight of the mixture and preferably about 40 to about 75 percent by weight of the mixture, a polyacrylic ester of an alkoxylated bisphenol-type compound represented by the general formula

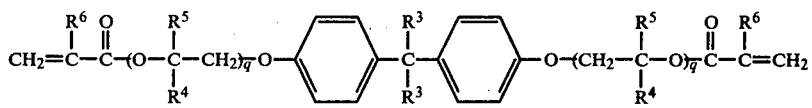

(II)

wherein $R^3$ is selected from the group consisting of methyl, ethyl, carboxyl and hydrogen; $R^4$ is selected from the group consisting of hydrogen, methyl and ethyl; $R^5$ is selected from the group consisting of hydrogen, methyl and hydroxyl; $R^6$ is selected from the group consisting of hydrogen, chlorine, methyl and ethyl; and q represents an integer of from 0 to 8.

Typical illustrative monomers within the purview of the foregoing Formula I are the ethylene glycol dimethacrylates such as triethylene glycol dimethacrylate, ethylene glycol dimethacrylate, tetraethylene glycol dimethacrylate, polyethylene glycol dimethacrylate, and the like, 1,3-butylene glycol dimethacrylate, trimethylol propane trimethacrylate, neopentyl glycol dimethacrylate, and the like.

Typical illustrative monomers within the purview of the foregoing Formula II are ethoxylated bisphenol A dimethacrylate, propoxylated bisphenol C dimethacrylate, propoxylated bisphenol A dimethacrylate, and the like.

A particularly preferred polymerizable monomer mixture is constituted from about 60 to about 40 parts by weight of an ethylene glycol dimethacrylate, e.g., tetraethylene glycol dimethacrylate, and about 40 to about 60 parts by weight of an alkoxylated bisphenol-type dimethacrylate, e.g., ethoxylated bisphenol A dimethacrylate.

The incorporation of the monomer derived from an alkoxylated bisphenol-type compound into the polymerizable monomer mixture provides several unexpected advantages. In particular, the present sealant compositions exhibit lower toxicity as compared to heretofore available commercial sealant compositions, improved heat resistance, improved strength, as well as improved performance on passive metal surfaces.

The polymerizable monomers used to formulate the present compositions need not be in the pure state but may comprise commercial grade materials in which polymerization inhibitors or stabilizers such as hydroquinone, benzoquinone, monomethyl ether hydroquinone, or the like are present.

Moreover, the polymerizable monomer mixture in the present sealant compositions can also contain some free acid such as acrylic acid, methacrylic acid, or the like, so that the acid number of the monomeric constituent is greater than zero. The acid number of the monomeric constituents in the sealant compositions of this invention usually is about 0.005 to about 0.05.

The inorganic salt initiator must be present in the anaerobic sealant composition in an amount sufficient to initiate polymerization of the monomers between two surfaces to be joined or bonded upon the exclusion of air, i.e., in the absence of a substantial amount of oxygen. The inorganic salt initiators suitable for practicing this invention are the perchlorates of ammonium, an alkali metal, or an alkaline earth metal, as well as the persulfates of ammonium, an alkali metal, or an alkaline earth metal. Illustrative inorganic salt initiators are ammonium persulfate, ammonium perchlorate, sodium persulfate, sodium perchlorate, potassium persulfate, potassium perchlorate, lithium perchlorate, calcium perchlorate, and magnesium perchlorate. Potassium perchlorate is a preferred initiator for the present anaerobic sealant compositions.

While some of the inorganic salt initiators contemplated herein are only sparingly soluble in the monomers present, in compounding the present liquid formulations the initiator can be introduced in a finely-divided or powdered form and in an excess quantity, and the undissolved and/or un-reacted excess subsequently filtered out. Alternatively, the initiator can be first dissolved in the accelerator and the resulting solution then combined with the monomer mixture, or an auxiliary solvent, chemically inert with respect to the formulation components, can be utilized, if desired. Illustrative of such auxiliary solvents are tetrahydrofuran, alcohols, cellosolve acetate, and the like. Auxiliary solvents that can be oxidized to organic peroxides should be avoided because the present initiator or catalyst system is not a peroxide or hydroperoxide system, and the presence of peroxides or hydroperoxides therein is undesirable.

The aforementioned inorganic salt initiators are ionic substances and are further characterized by the fact that the non-oxygen component of the anion in each case has an atomic oxidation state of +7 as defined in Mahn, *Textbook of University Chemistry*, pp. 223 et seq., Addison-Wesley Pub. Co. (1965).

The specific amount of inorganic salt initiator utilized in a given anaerobic sealant composition will vary depending on the particular initiator, monomer, and accelerator or accelerators that are used. Preferably the amount of initiator present in the anaerobic sealant compositions of this invention can be about 0.005 to about 15 parts by weight per 100 parts by weight of the monomer mixture. The amount of initiator used includes the amount of initiator present as such in the final product plus any amount of initiator that may have entered into chemical reaction with other components present. Analyses of the prepared anaerobic compositions for the cation element of the initiator indicate that the cation element is usually present in a less than stoichiometric amount relative to the non-oxygen element of the anion. In compounding the present compositions it is preferable to initially add an excess of the inorganic salt initiator and subsequently remove any undissolved solids after the composition has been aged. During compounding the inorganic salt initiator can be added to the composition in an amount of up to about 20 parts by weight per 100 parts by weight of the monomer mixture, preferably about 1 to about 20 parts by weight per 100 parts by weight of the monomer mixture.

The modifier contemplated by the present invention is a N-nitrosoamine. These compounds are commercially available and can be represented by the general formula

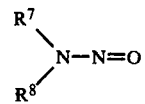

wherein $R^7$ and $R^8$ can be alike or different, and individually can be alkyl containing up to about 8 carbon atoms, aryl, alkaryl and aralkyl containing 6 to about 18 carbon atoms, and together can also form a bivalent hydrocarbon chain of 2 to 12 carbon atoms which, together with the associated nitrogen atom, forms a heterocyclic ring. This hydrocarbon chain can be a cycloaliphatic chain (e.g., cycloalkenylene or cycloalkylene) with or without associated adjacent fused ring structure which shares carbon atoms with the cycloaliphatic chain.

Illustrative of the N-nitrosoamines contemplated by the present invention are the dialkyl-substituted amines, e.g., N-nitrosodipropylamine, N-nitroso-N-ethyl-N-methylamine, N-nitroso-N-butyl-N-methylamine, N-nitroso-N-butyl-N-propylamine, N-nitrosodibutylamine, N-nitrosodioctylamine, and the like, the aromatic amines, e.g., N-nitrosodiphenylamine, N-nitroso-N-phenyl-N-benzylamine, N-nitroso-N-methylaniline, N-nitroso-N-phenyl-N-tolylamine, N-nitrosodibenzylamine, and the like, as well as the heterocyclic amines, e.g., N-nitrosopiperidine, N-nitrosoaziridine, N-nitrosoazetidine, N-nitrosopyrrolidine, N-nitrosohexamethyleneimine, N-nitrosopyrazole, N-nitrosoimidazole, N-nitrosoindole, N-nitrosocarbazole, and the like.

The N-nitrosoamine modifier can be present in the composition in an amount of about 0.03 to about 1 part by weight per 100 parts of the monomer blend or mixture, preferably about 0.075 to about 0.9 parts by weight, and most preferably about 0.075 to about 0.3 parts by weight. In general, the more viscous the sealant composition the greater the amount of the modifier present.

The preferred polymerization accelerators to be used in conjunction with the foregoing inorganic salt initiators can be a tertiary amine, a N,N-di(lower alkyl)amide of a monocarboxylic aliphatic acid, an organic carboximide of a polycarboxylic acid, an organic sulfimide of a carboxylic acid, or combinations thereof, present in an amount sufficient to accelerate polymerization of the monomer mixture in the absence of air.

Illustrative tertiary amines are alkyl, aryl and/or aralkyl-substituted amines. Typical of the trialkylamines are triethylamine, tripropylamine, tributylamine, and the like. Particularly desirable are the N,N-dialkyl aryl amines of the general formula

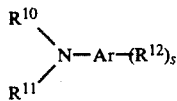

wherein $R^{10}$ and $R^{11}$ are hydrocarbyl groups containing up to about 10 carbon atoms, preferably lower alkyl containing up to 4 carbon atoms, and wherein Ar represents an aromatic nucleus which can be phenyl or naphthyl. $R^{12}$ is a hydrocarbyl group containing up to 5 carbon atoms, preferably lower alkyl or alkoxy containing up to 4 carbon atoms, and s is an integer having a value of 0 to 5, inclusive, with the proviso that when $R^{12}$ is in the ortho position on the aromatic nucleus s has a value greater than 1. The preferred N,N-dialkyl aryl amine accelerator is N,N-dimethyl-p-toluidine, N,N-diethyl-p-toluidine, N,N-dimethyl-o-toluidine, and the like.

The tertiary amine-type accelerator can be present in the composition in an amount of about 0.1 to about 2 parts by weight per 100 parts by weight of the monomer mixture or blend, and preferably in an amount of about 0.3 to about 0.7 parts by weight per 100 parts by weight of the monomer mixture or blend.

Illustrative N,N-di(lower alkyl)carboxamides are N,N-dimethyl formamide, N,N-diethyl formamide, N,N-dibutylformamide, N,N-dimethyl acetamide, N,N-diethyl propionamide, and the like.

The amide-type accelerator can be present in the composition in an amount of about 0.5 to about 40 parts by weight per 100 parts of the monomer mixture or blend and preferably in an amount of about 5 to about 20 parts by weight per 100 parts by weight of the monomer mixture or blend. In general, the greater the amount of amide-type accelerator present in the sealant composition, the faster the rate of set; however, the ultimate break-away strength is decreased.

Illustrative organic carboximides of a polycarboxylic acid are those having the general formula

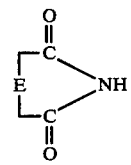

wherein E represents an aromatic or an aliphatic chain nucleus derived from a polycarboxylic acid. Illustrative carboximide accelerators are succinimide, maleimide, malonimide, glutarimide, cyclohexyldicarboximide, phthalimide, 1,2,4-benzenetricarboximide, naphthalimide, the metal salts thereof, and the like.

The carboximide-type accelerator can be present in the composition in an amount of about 0.25 to about 2 parts by weight per 100 parts by weight of the monomer mixture or blend, and preferably in an amount of about 0.5 to about 2 parts by weight per 100 parts by weight of the monomer mixture or blend.

Illustrative organic sulfimides of a polycarboxylic acid are represented by the general formula

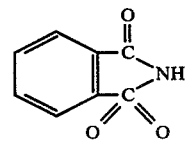

Illustrative sulfimides are benzoic sulfimide, sodium salt of benzoic sulfimide, and the like.

The sulfimide-type accelerator can be present in the composition in an amount of about 0.1 to about 2 parts by weight per 100 parts by weight of the monomer mixture or blend, and preferably about 0.25 to about 1 part by weight per 100 parts by weight of the monomer mixture or blend.

A preferred accelerator is a combination of a N,N-dialkyl aryl amine with a sulfimide-type accelerator, in particular, a combination of benzoic sulfimide with N,N-dimethyl-p-toluidine. If desired, an amide-type accelerator such as N,N-dimethyl formamide can also be combined therewith in order to provide sealant grades of varying ultimate strength. The preferred relative amounts of the individual components in the foregoing accelerator combination, expressed as parts by weight per 100 parts of the monomers present, are as follows:

- benzoic sulfimide — about 0.25 to about 1 part by weight
- N,N-dimethyl-p-toluidine — about 0.3 to about 0.7 parts by weight
- N,N-dimethylformamide — 0 to about 10 parts by weight.

As pointed out hereinabove, a small amount of stabilizer, such as a quinone-type stabilizer usually is present in the commercial grades of the polyacrylic ester monomer blends suitable for the present sealant compositions. However, the present sealant compositions must contain a sufficient amount of a suitable stabilizer to retard polymerization of the monomers during storage of the sealant composition in the presence of air, thus sometimes the amount of stabilizer present in the commercial monomer compositions is supplemented. By the term "quinone-type stabilizer" as used herein and in the claims is meant quinone and its derivatives such as the benzoquinones, the naphthoquinones, the hydroquinones, and the like. Illustrative quinone-type stabilizers are 1,4-benzoquinone, 2,5-dihydroxy benzoquinone, 2,5-diphenyl-p-benzoquinone, 1,2-naphthoquinone, 9,10-anthraquinone, monomethyl ether hydroquinone, tetrachloro-p-benzoquinone, 2,3-dichloro-1,4-naphthaquinone, and the like.

The amount of quinone-type stabilizer in the present anaerobic sealant compositions can vary depending on the nature of the accelerator that is used. In general, the greater the activity of the accelerator, the more stabilizer should be present in the formulation. When a quinone-type stabilizer is present, it is usually present in an amount of about 50 to about 200 parts by weight per one million parts by weight of the monomer blend (p.p.m.), or more. Preferably about 75 p.p.m. to about 150 p.p.m. of the hydroquinone or methyl ether hydroquinone type stabilizer are present.

For optimum performance of the anaerobic sealant compositions, the weight ratio of the accelerator to the initiator in any given instance is also a factor. The overall accelerator-to-initiator weight ratio can be about 8400:1 to about 1:150 respectively. Where the accelerator is a tertiary amine, the accelerator-to-initiator weight ratio can be about 400:1 to about 1:60. Where the accelerator is a N,N-di(lower alkyl) carboxamide, the accelerator-to-initiator weight ratio can be about 8000:1 to about 1:30, respectively. In instances where the accelerator is a sulfonimide or a carboximide the accelerator-to-initiator weight ratio can be about 400:1 to about 1:60, respectively. However, where a mixture of a N,N-dialkyl arylamine and a sulfonimide is used as the accelerator, the accelerator-to-initiator ratio can be about 800:1 to about 1:45, respectively. The accelerator-to-modifier weight ratio preferably is about 130:1 to about 1:3.

Commercial grade monomers that constitute the polymerizable mixture may partially polymerize upon standing and as a result may develop a relatively high gel content. This condition can be detected by dissolving the individual monomers or the monomer admixture in anhydrous methanol and noting any haze or precipitate that develops. In instances where monomers having a relatively high gel content are used to prepare anaerobic sealant compositions, the relative amounts of accelerator and modifier preferably are adjusted upwardly in order to enhance the shelf life of the produced sealant compositions. In general, the higher the observed gel content in the aforesaid methanol test, the greater should be the amount of the N-nitrosoamine modifier that is present in the composition. It should be noted, however, that the presence of prepolymerized monomers in the present anaerobic sealant compositions is not always undesirable inasmuch as the performance characteristics as well as the physical properties of the sealant compositions can be modified by regulating the amount of prepolymer that is present.

Depending on the intended end use of the sealant compositions, the viscosity thereof can vary. A liquid composition of relatively low viscosity and good surface tension which enhances capillary action is desirable for joining closely fitting surfaces or for sealing pre-assembled parts by sealant penetration between the mating surfaces. On the other hand, where relatively loosely fitting surfaces are to be joined or void spaces are to be filled, compositions having a relatively high viscosity or having thixotropic properties are preferred. In general, the sealant compositions can have a viscosity in the range of about 10 to about 8000 centipoises as determined at room temperature using a Brookfield viscometer at 5 revolutions per minute and fitted with spindle No. RV #1 for viscosities up to 2000 cp and RV #2 for higher viscosities.

The viscosity characteristics of the sealant composition can be adjusted to the desired value by using a variety of inert thickeners such as fumed or colloidal silica, polymethylmethacrylate, polyacrylic rubber, cellulose acetate butyrate, diallyl phthalate, and the like. Also suitable are reactive thickening agents such as polyvinyl chloride, chlorinated rubber, tetrahydrofurfuryl methacrylate, and the like. In addition, colorants, plasticizers such as dioctyl phthalate, and the like, release agents such as glycerin, and the like, and inert fillers such as tetrafluoroethylene floc or powder, and the like, can also be added.

The anaerobic sealant compositions are compounded by first admixing a predetermined amount of the polymerizable polyacrylate ester monomers and the inorganic salt initiator. Thereafter at least a portion of the accelerator (e.g., benzoic sulfimide) is added, and the resulting admixture is aged until anaerobic properties are developed. Preferably the accelerator added at this stage of compounding is of the type which promotes dissolution of the initiator in the admixture.

Aging of the prepared admixture can be carried out at ambient or room temperature or at an elevated temperature. The necessary aging period depends to some extent on the aging temperature since anaerobic properties are developed in the composition within a relatively shorter time period at elevated temperatures. The aging period usually is about 12 hours to about 20 days depending on the temperature. Aging temperatures up to about 200° F. are suitable. At ambient temperature the produced compositions preferably are aged for seven to ten days. At elevated temperatures, for example, at about 120° F., the compositions preferably are aged about one day. After aging, any solid materials present in the produced anaerobic composition are filtered out or otherwise removed, e.g., by centrifuging and decanting the composition. After aging and undissolved solids removal, the modifier and additional accelerator (e.g., dimethyl-p-toluidine) are added, and the resulting composition is stirred to produce a substantially homogeneous admixture that is ready for use.

The efficacy of the anaerobic sealant composition can be evaluated by several tests.

The shelf life of an anaerobic sealant composition is ascertained by maintaining the composition in a low-density air-permeable polyethylene bottle at a temperature of 120± 3° F. and checking the composition for onset of polymerization (gelation) at 24-hour intervals. A sealant composition free from gelation after 10 days at 120± 3° F. will usually have a shelf life under normal storage conditions for at least one year.

Set time and ultimate strength for an anaerobic sealant composition is ascertained by a "finger-tight" test and locking torque test. These tests are performed by applying a few drops of the sealant composition to the exposed threads of a degreased ⅜-inch unoxidized steel bolt having 24 threads per inch (Unified Fine Thread Series, Class 2 fit) fitted with a degreased ⅜-inch nut (FF-N-836). Both the bolt and the nut are degreased in 1,1,1-trichloroethane. The nut is unscrewed over the wetted threads until the end of the nut is flush with the end of the bolt and then screwed back on until about ⅛ to 3/16-inch of the bolt protrudes through the nut. In this manner complete coverage of the engaged metal area by the sealant composition is assured.

A bolt treated in the foregoing manner is then placed head down on a level surface and allowed to stand. From time to time the nut and bolt are checked to ascertain whether or not the sealant has set to a degree where the nut is "finger-tight" on the bolt, i.e., whether the nut still can be manually turned relative to the bolt without the aid of a wrench or a similar tool. The time period necessary to reach a "finger-tight" set is noted and recorded as set time.

About 24 hours after the nut and bolt have reached a finger-tight set the bolt head is clamped in a vise with the bolt shank disposed vertically. A torque wrench is applied to the nut and the torques required to dislodge the nut (breakaway torque) and to turn the nut after dislodging (runaway torque) are determined. Runaway torque is recorded as the average torque necessary to turn the nut at one-quarter, one-half, three-quarters, and one full turn after the nut has been dislodged by application of the breakaway torque.

Commercially preferred anaerobic sealant compositions are those exhibiting a set time to a finger-tight condition of less than about 24 hours, and a value for breakaway torque or runaway torque of 5 inch-pounds or greater.

The present invention is further illustrated by the following examples.

EXAMPLE 1

Anaerobic Sealant Composotion Containing a Monomer Blend and a N-Nitrosodiphenylamine Modifier An anaerobic sealant composition was compounded using a mixture of tetraethylene glycol dimethacrylate monomer (about 58 parts by weight; containing hydroquinone in an amount of about 90 parts per million parts of the monomer), and ethoxylated bisphenol A dimethacrylate monomer (about 42 parts by weight; containing monoethyl ether hydroquinone in an amount of about 300 parts per million parts of the monomer), potassium perchlorate (about 0.32 parts by weight), benzoic sulfimide (about 0.28 parts by weight), dimethyl-p-toluidine (about 0.35 parts by weight), N-nitrosodiphenylamine (about 0.087 parts by weight, cellulose acetate butyrate (about 4.9 parts by weight), dioctyl phthalate (about 37.6 parts by weight), and colorant. Initially an admixture of the monomer blend and potassium perchlorate was produced, benzoic sulfimide added, and the admixture then aged at room temperature for about ten days. The aged admixture was thereafter filtered, dimethyl-p-toluidine, N-nitrosodiphenylamine and the rest of the constituents added thereto, and stirred. The produced composition was tested for set time, and for breakaway torque and runaway torque, using ⅜-inch steel bolts and nuts. Gelling time at 120° F. was also noted.

The set time was found to be about 30 minutes and the gelling time at 120° F. greater than 10 days. The breakaway torque was found to be 124 inch-pounds and the runaway torque was found to be 55 inch-pounds.

EXAMPLE 2

Activity of N-Nitrosoamine-Containing Sealant Compositions on Passive Surfaces

An anaerobic sealant composition was prepared by admixing tetraethylene glycol dimethacrylate monomer (about 60 parts by weight; containing about 90 p.p.m. hydroquinone), ethoxylated bisphenol A dimethacrylate (about 40 parts by weight; containing about 300 p.p.m. monomethyl ether hydroquinone), potassium perchlorate (about 0.32 parts by weight), benzoic sulfimide (about 0.3 parts by weight), dimethyl-p-toluidine (about 0.35 parts by weight), N-nitrosodiphenyl amine (about 0.09 parts by weight), cellulose acetate butyrate (about 4 parts by weight), and colorant in substantially the same manner as in Example 1. The resulting composition was tested on ⅜"-24 bolts and nuts made of steel, zinc-coated steel, and stainless steel. The test results are compiled in Table I, below.

Table I

| | Activity of Composition on Passive Surfaces | | |
|---|---|---|---|
| Test Surface | Set Time, hrs:min | Torque, in-lbs. | |
| | | Breakaway | Runaway |
| steel | 0:45 | 84 | 321 |
| zinc-coated steel | 1:30 | 72 | 320 |
| stainless steel | 0:45 | 48 | 247 |

As can be seen from the foregoing test results, the present anaerobic sealant composition is active on stainless steel and zinc-coated steel surfaces as well as on steel surfaces. In addition, no corrosion of the steel surface was observed on the steel surface after storage for 30 days at ambient conditions.

EXAMPLE 3

Anaerobic Systems Using a Monomer Blend

Anaerobic sealant composition was prepared in substantially the same manner as set forth in Example 1 utilizing a tetraethylene glycol dimethacrylate monomer (about 58 parts by weight; containing about 90 p.p.m. hydroquinone), ethoxylated bisphenol A dimethacrylate (about 42 parts by weight; containing about 300 p.p.m. monomethyl ether hydroquinone), potassium perchlorate initiator (about 0.32 parts by weight, benzoic sulfimide (about 0.29 parts by weight), dimethyl-p-toluidine (about 0.35 parts by weight), N-nitrosodiphenyl amine (about 0.11 parts by weight), cellulose acetate butyrate (about 2.3 parts by weight), and colorant. The obtained composition was tested for shelf life and for set time and strength on ⅜"-24 steel and stainless steel bolts and nuts. The test results are presented in Table II, below.

Table II
Anaerobic System Using A Monomer Blend

| Monomer Blend | KClO$_4$, parts by wt. | Shelf Life at 120° F. | Set Time (hrs:min) and Torque in in-lbs (breakaway/runaway) steel | stainless steel |
|---|---|---|---|---|
| tetraethylene glycol dimethacrylate and ethoxylated bisphenol A dimethacrylate | 0.32 | >10 days | 0:30<br>72/316 | 0:45<br>60/258 |

The foregoing data indicate that good set time and strength characteristics can be obtained on both steel and stainless steel surfaces with sealant compositions that include a monomer blend in a perchlorate-initiated system.

EXAMPLE 4
Anaerobic Pipe Sealant Composition

An anaerobic sealant composition suitable for use as a pipe sealant was compounded in a manner substantially similar to that set forth in Example 1 and utilizing the following constituents in the approximate amounts stated:

|  | Parts by Weight |
|---|---|
| tetraethylene glycol dimethacrylate | 50 |
| ethoxylated bisphenol A dimethacrylate | 50 |
| potassium perchlorate | 0.27 |
| benzoic sulfimide | 0.44 |
| N-nitrosodipheylamine | 0.077 |
| dimethyl-p-toluidine | 0.50 |
| titanium dioxide | 9.6 |
| tetrafluoroethylene powder | 15.3 |
| dioctyl phthalate | 58.4 |
| fumed silica | 7.0 |

The produced composition was tested for set time and for strength on ⅜"-24 steel and stainless steel nuts and bolts. The test results are set forth in Table III, below.

Table III
Pipe Sealant Compositon Performance

| Test Surface | Set Time, hrs:min | Torque, in-lbs. Breakaway | Runaway |
|---|---|---|---|
| steel | 1:30 | 48 | 12 |
| stainless steel | 1:15 | 30 | 12 |

Typical other anaerobic sealant compositions that can be compounded embodying the present invention are as follows:

| Formulation I | Parts by Weight |
|---|---|
| tetraethylene glycol dimethacrylate | 55 |
| propoxylated bisphenol A dimethacrylate | 45 |
| potassium perchlorate | 0.3 |
| benzoic sulfimide | 0.3 |
| N-nitrosodiphenylamine | 0.3 |
| dimethyl-p-toluidine | 0.3 |
| colorant | 0.01 |
| cellulose acetate butyrate | 7 |

| Formulation II | Parts by Weight |
|---|---|
| tetraethylene glycol dimethacrylate | 60 |
| ethoxylated bisphenol A dimethacrylate | 40 |
| potassium perchlorate | 0.2 |
| benzoic sulfimide | 0.2 |
| N-nitrosodiphenylamine | 0.1 |
| dimethyl-p-toluidine | 0.2 |
| colorant | 0.004 |
| dioctyl phthalate | 40 |

| Formulation III | Parts by Weight |
|---|---|
| tetraethylene glycol dimethacrylate | 40 |
| ethoxylated bisphenol A dimethacrylate | 60 |
| potassium perchlorate | 0.55 |
| benzoic sulfimide | 0.5 |
| N-nitrosodiphenylamine | 0.9 |
| dimethyl-p-toluidine | 0.6 |
| titanium dioxide | 16 |
| tetrafluoroethylene powder | 30 |
| polyester plasticizer | 120 |
| fumed silica | 6 |

| Formulation IV | Parts by Weight |
|---|---|
| tetraethylene glycol dimethacrylate | 100 |
| ethoxylated bisphenol A dimethacrylate | 75 |
| potassium perchlorate | 0.55 |
| benzoic sulfimide | 1.0 |
| N-nitrosodiphenylamine | 0.3 |
| dimethyl-p-toluidine | 0.8 |
| colorant | 0.02 |
| diallyl phthalate resin | 30 |

EXAMPLE 5
Toxicity Evaluation of Anaerobic Sealants

Aliquots of an anaerobic sealant composition compounded substantially in accordance with Example 1 were used to determine acute oral toxicity, primary skin irritation, and eye irritation.

A. Determination of Acute Oral Toxicity

An aliquot of the composition was administered orally to overnight fasted rats of the Sprague-Dawley strain. The oral administration was performed by the use of a syringe with a modified 17-gauge hypodermic needle as an oral feeding tube. The animals were observed following dosing and over a subsequent fourteen day observation period. At the conclusion the survivors were weighed, sacrificed, and subjected to a gross autopsy.

Results obtained are shown in Table IV, below.

Table IV
Acute Oral Toxicity in Rats

| Animal Number | Body Weight, Grams | Dose* Ml/Kg | Dose, Milliliters | Weight Gain in 14 Days, Grams | Days to Death |
|---|---|---|---|---|---|
| 2910 | 219 | 5 | 1.10 | 101 | Survived |
| 2911 | 243 | 5 | 1.22 | 103 | Survived |
| 2912 | 241 | 5 | 1.21 | 118 | Survived |
| 2913 | 228 | 5 | 1.14 | 100 | Survived |

Table IV-continued
Acute Oral Toxicity in Rats

| Animal Number | Body Weight, Grams | Dose* Ml/Kg | Dose, Milliliters | Weight Gain in 14 Days, Grams | Days to Death |
|---|---|---|---|---|---|
| 2914 | 219 | 5 | 1.10 | 124 | Survived |
| 2915 | 231 | 5 | 1.16 | 119 | Survived |
| 2916 | 234 | 5 | 1.17 | 105 | Survived |
| 2917 | 219 | 5 | 1.10 | 120 | Survived |
| 2918 | 226 | 5 | 1.13 | 112 | Survived |
| 2919 | 200 | 5 | 1.00 | 93 | Survived |

*Specific Gravity = 1

Autopsy: Four with bleached livers.
Conclusion: The acute oral $LD_{50}$ in rats is greater than 5 g/kg body weight, thus the composition is considered to be non-toxic by oral ingestion.

B. Determination of Skin Irritation

The hair was clipped from the abdomen of six male albino rabbits; and two areas of the abdomen, approximately ten centimeters apart, were designated for application of the patches. A one inch square site on the right side was abraded, while a similar site on the left remained unabraded.

The test sample (one-half milliliter) was placed on the skin under a small square of cotton gauze and maintained in contact with the skin under a larger square of polyethylene film and anchored to the skin with strips of adhesive tape. A square of flannel cloth was then taped around the trunk of the animal to further protect the patches from being dislodged.

After 24 hours the vest and patches were removed and the skin examined for signs of irritation (erythema and/or edema). Examination was made after 72 hours and the observed skin reactions were evaluated as follows:

| Evaluation of Skin Reactions | Value* |
|---|---|
| I. Erythema and Eschar Formation | |
| Very slight erythema (barely perceptible) | 1 |
| Well defined erythema | 2 |
| Moderate to severe erythema | 3 |
| Severe erythema (beet redness) to slight eschar formation (injuries in depth) | 4 |
| II. Edema Formation | |
| Very slight edema (barely perceptible) | 1 |
| Slight edema (edges of area well defined by definite raising) | 2 |
| Moderate edema (area raised approx. 1 mm) | 3 |
| Severe edema (raised more than 1 mm and extending beyond area of exposure) | 4 |

*The value recorded for each reading is the average value of the animals subject to the test.

Calculation of Primary Irritation Scores

Average values for erythema and eschar formation at 24 hours and 72 hours for intact skin are added to values on abraded skin at 24 hours and 72 hours (4 values). Similarly values for edema formation at 24 hours and 72 hours for intact and abraded skin are added (4 values).

The total of the 8 values is divided by 4 to give the primary irritation score.

A primary skin irritant is a substance which results in an empirical primary irritation score of 5 or more.

Irritation scores are shown in Table V, below.

Table V
Rabbit Primary Skin Irritation

| Rabbit Number | 24 HOURS | | | | 72 HOURS | | | |
|---|---|---|---|---|---|---|---|---|
| | UNABRADED | | ABRADED | | UNABRADED | | ABRADED | |
| | Erythema | Edema | Erythema | Edema | Erythema | Edema | Erythema | Edema |
| 1274 | 3 | 0 | 3 | 1 | 1 | 0 | 1 | 0 |
| 1275 | 3 | 1 | 3 | 1 | 1 | 0 | 1 | 0 |
| 1276 | 2 | 0 | 2 | 0 | 0 | 0 | 0 | 0 |
| 1277 | 2 | 0 | 2 | 0 | 0 | 0 | 0 | 0 |
| 1278 | 2 | 0 | 2 | 0 | 0 | 0 | 0 | 0 |
| 1279 | 3 | 0 | 3 | 0 | 1 | 0 | 1 | 0 |
| Average: | 2.5 | 0.17 | 2.50 | 0.33 | 0.50 | 0.0 | 0.50 | 0.0 |

Primary Skin Irritation Score: 6.50/4 = 1.63

The foregoing low primary skin irritation score indicates that the composition is not considered to be a skin irritant.

C. Determination of Eye Irritation

One-tenth milliliter of the test sample was instilled into the right eye of each of six rabbits, the left eye remaining untreated to serve as control.

Observations of ocular lesions were made on the rabbits' eyes after 24, 48, and 72 hours. At these intervals the extent and degree of irritation were scored as set forth in Table VI, below. The general technique of evaluation and scoring followed the recommendations of J. H. Draize, G. Woodard, and H. O. Calvery, Journal of Pharmacology and Experimental Therapeutics, vol. 82, p. 377 (1944) and Sec. 191.12 of Federal Hazardous Substances Labeling Act Regulations Guide for Grading Eye Irritation.

Table VI
Grades for Ocular Lesions

| Cornea | |
|---|---|
| No ulceration or opacity | 0 |
| Scattered or diffused areas of opacity (other than slight dulling or normal luster), details of iris clearly visible | 1 |
| Easily discernible translucent area, details of iris slightly obscured | 2 |
| Nacreous areas, no details of iris visible, size of pupil barely discernible | 3 |
| Complete corneal opacity, iris not discernible | 4 |
| Iris | |
| Normal | 0 |
| Markedly deepened folds, congestion, swelling, moderate circumcorneal injection (any of these or combination of any thereof), iris still reacting to light (sluggish reaction is positive) | 1 |
| No reaction to light, hemorrhage, gross destruction (any or all of these) | 2 |
| Conjunctivae | |
| Redness (refers to palpebral and bulbar conjunctivae excluding cornea and iris). | |
| Vessels normal | 0 |
| Some vessels definitely injected | 1 |
| Diffuse, crimson red individual vessels not easily discernible | 2 |
| Diffuse beefy red | 3 |

Table VI-continued

| Grades for Ocular Lesions | |
|---|---|
| Chemosis | |
| No swelling | 0 |
| Any swelling above normal (includes nictitating membrane) | 1 |
| Obvious swelling with partial eversion of lids | 2 |
| Swelling with lids about half closed | 3 |
| Swelling with lids more than half closed | 4 |

The obtained scores are compiled in Table VII, below.

Table VII

| Rabbit Eye Irritation | | | | | | | | | |
|---|---|---|---|---|---|---|---|---|---|
| Rabbit Number | 1 | | | 2 | | | 3 | | |
| Hours After Treatment | 24 | 48 | 72 | 24 | 48 | 72 | 24 | 48 | 72 |
| Cornea | 0 | 0 | 0 | 0 | 0 | 0 | 0 | 0 | 0 |
| Iris | 0 | 0 | 0 | 0 | 0 | 0 | 0 | 0 | 0 |
| Conjunctivae: Erythema | 0 | 0 | 0 | 1 | 1 | 1 | 2 | 1 | 0 |
| Chemosis | 0 | 0 | 0 | 0 | 0 | 0 | 0 | 0 | 0 |
| Rabit Number | 4 | | | 5 | | | 6 | | |
| Hours After Treatment | 24 | 48 | 72 | 24 | 48 | 72 | 24 | 48 | 72 |
| Cornea | 0 | 0 | 0 | 0 | 0 | 0 | 0 | 0 | 0 |
| Iris | 0 | 0 | 0 | 0 | 0 | 0 | 0 | 0 | 0 |
| Conjunctivae: Erythema | 0 | 0 | 0 | 1 | 1 | 0 | 1 | 1 | 1 |
| Chemosis | 0 | 0 | 0 | 0 | 0 | 0 | 0 | 0 | 0 |

The foregoing results indicate that the composition is not considered to be an eye irritant.

The foregoing description and the examples are intended as illustrative and are not to be taken as limiting. Still other variations within the spirit and scope of the invention are possible and will readily present themselves to one skilled in the art.

We claim:

1. A relatively high-strength anaerobic sealant composition having an extended shelf life in the presence of air and low toxicity, and which is capable of polymerization upon exclusion of air, comprising:

a polymerizable monomer mixture including a polyacrylic ester represented by the general formula

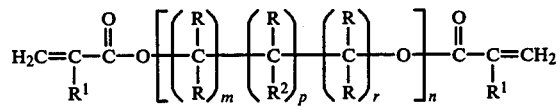

wherein R is a member of the group consisting of hydrogen, alkyl containing 1 to 4 carbon atoms, inclusive, hydroxyalkyl containing 1 to 4 carbon atoms, inclusive, and

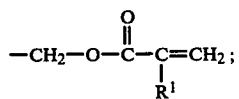

$R^1$ is a member of the group consisting of hydrogen, halogen, and alkyl containing 1 to 4 carbon atoms, inclusive; $R^2$ is a member of the group consisting of hydrogen, alkyl containing 1 to 4 carbon atoms, inclusive, hydroxy, and

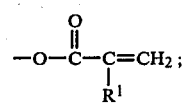

m is an integer having a value of at least 1; n is an integer having a value of at least 1; p is an integer having a value of 0 or 1; and r is an integer having a value of at least 1; and a polyacrylic ester of an alkoxylated bisphenol-type compound present in an amount of at least about 15 percent by weight of the mixture and represented by the general formula

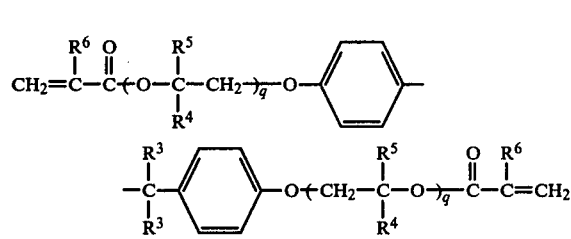

wherein $R^3$ is selected from the group consisting of methyl, ethyl, carboxyl and hydrogen; $R^4$ is selected from the group consisting of hydrogen, methyl and ethyl; $R^5$ is selected from the group consisting of hydrogen, methyl and hydroxyl; $R^6$ is selected from the group consisting of hydrogen, chlorine, methyl and ethyl; and q represents an integer of from 0 to 8;

an inorganic salt initiator which is a member of the group consisting of ammonium perchlorate, alkali metal perchlorate, alkaline earth metal perchlorate, ammonium persulfate, alkali metal persulfate, and alkaline earth metal persulfate, present in an amount sufficient to initiate polymerization of the monomer in the absence of air;

a modifier which is a N-nitrosoamine present in an amount of about 0.03 to about 1 part by weight per 100 parts of said monomer mixture;

an accelerator present in an amount sufficient to accelerate polymerization of the monomer mixture in the absence of air; and a quinone-type polymerization inhibitor in an amount sufficient to retard polymerization of the monomer mixture during storage of the composition in the presence of air.

2. The anaerobic sealant composition in accordance with claim 1 wherein the modifier is present in the composition in an amount of about 0.075 to about 0.9 parts by weight per 100 parts by weight of the monomer mixture.

3. The anaerobic sealant composition in accordance with claim 1 wherein the modifier is present in the composition in an amount of about 0.075 to about 0.3 parts by weight per 100 parts by weight of the monomer mixture.

4. The anaerobic sealant composition in accordance with claim 1 wherein the modifier is a N-nitrosoamine of the general formula

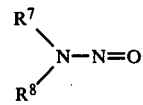

wherein $R^7$ and $R^8$ are members of the group consisting of alkyl containing up to about 8 carbon atoms, aryl, alkaryl, aralkyl containing 6 to about 18 carbon atoms, and a bivalent hydrocarbon chain of 2 to 12 carbon atoms, inclusive.

5. The anaerobic sealant composition in accordance with claim 1 wherein the modifier is an aromatic N-nitrosoamine.

6. The anaerobic sealant composition in accordance with claim 5 wherein the aromatic N-nitrosoamine is N-nitrosodiphenylamine.

7. The anaerobic sealant composition in accordance with claim 1 wherein the modifier is N-nitrosodiphenylamine and wherein the accelerator comprises as a major portion by weight benzoic sulfimide and as a minor portion by weight dimethyl-p-toluidine.

8. The anaerobic sealant composition in accordance with claim 1 wherein the polymerizable monomer mixture comprises about 60 to about 25 parts by weight of an ethylene glycol dimethacrylate and about 40 to about 75 parts by weight, respectively, of an alkoxylated bisphenol-type dimethacrylate.

9. The anaerobic sealant composition in accordance with claim 1 wherein the polymerizable monomer mixture includes ethoxylated bisphenol A dimethacrylate, wherein the initiator is potassium perchlorate, wherein the accelerator is a mixture of benzoic sulfimide and dimethyl-p-toluidine, and wherein the modifier is N-nitrosodiphenylamine.

10. The anaerobic sealant composition in accordance with claim 1 wherein the monomer mixture is constituted by tetraethylene glycol dimethacrylate and ethoxylated bisphenol A dimethacrylate, wherein the initiator is potassium perchlorate, wherein the accelerator is a mixture of benzoic sulfimide and dimethyl-p-toluidine, and wherein the modifier is N-nitrosodiphenylamine; said ethoxylated bisphenol A dimethacrylate being present in the mixture in an amount of about 40 to about 60 percent by weight.

11. The anaerobic sealant composition in accordance with claim 1 wherein the monomer is a mixture of about 60 parts by weight tetraethylene glycol dimethacrylate and about 40 parts by weight ethoxylated bisphenol A dimethacrylate, wherein the initiator is potassium perchlorate in an amount of about 0.005 to about 15 parts by weight per 100 parts by weight of the monomer mixture, wherein the accelerator is benzoic sulfimide in an amount of about 0.25 to about 1 part by weight per 100 parts by weight of the monomer mixture and N,N-dimethyl-p-toluidine in an amount of about 0.3 to about 0.7 parts by weight per 100 parts by weight of the monomer mixture, and wherein the modifier is N-nitrosodiphenylamine in an amount of about 0.075 to about 0.9 parts by weight per 100 parts by weight of the monomer.

12. The anaerobic sealant composition in accordance with claim 1 wherein the monomer is a mixture of about 50 parts by weight tetraethylene glycol dimethacrylate and about 50 parts by weight ethoxylated bisphenol A dimethacrylate, wherein the initiator is potassium perchlorate in an amount of about 0.005 to about 15 parts by weight per 100 parts by weight of the monomer mixture, wherein the accelerator is benzoic sulfimide in an amount of about 0.25 to about 1 part by weight per 100 parts by weight of the monomer mixture and N,N-dimethyl-p-toluidine in an amount of about 0.3 to about 0.7 parts by weight per 100 parts by weight of the monomer mixture, and wherein the modifier is N-nitrosodiphenylamine in an amount of about 0.075 to about 0.9 parts by weight per 100 parts by weight of the monomer.

* * * * *